United States Patent
Satoh

(10) Patent No.: US 8,175,419 B2
(45) Date of Patent: May 8, 2012

(54) IMAGE SEARCH APPARATUS, IMAGE SEARCH METHOD, AND STORAGE MEDIUM STORING A PROGRAM FOR CAUSING A SEARCH APPARATUS TO EXECUTE A SEARCH METHOD

(75) Inventor: Naoyuki Satoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 12/194,373

(22) Filed: Aug. 19, 2008

(65) Prior Publication Data

US 2009/0052787 A1    Feb. 26, 2009

(30) Foreign Application Priority Data

Aug. 24, 2007 (JP) ................................ 2007-218898

(51) Int. Cl.
*G06K 9/20* (2006.01)
(52) U.S. Cl. ........ 382/305; 382/282; 707/915; 705/27.2
(58) Field of Classification Search .................. 382/305, 382/282; 358/403; 707/705, 915; 705/27.1, 705/27.2
See application file for complete search history.

(56) References Cited

U.S. PATENT DOCUMENTS

| | | | | |
|---|---|---|---|---|
| 6,016,487 A * | 1/2000 | Rioux et al. | .................. | 707/743 |
| 7,171,060 B2 * | 1/2007 | Park et al. | ..................... | 382/305 |
| 2002/0007225 A1 * | 1/2002 | Costello et al. | .................. | 700/99 |
| 2004/0254864 A1 * | 12/2004 | Mitsuoka et al. | ............... | 705/29 |
| 2006/0178944 A1 * | 8/2006 | Katter et al. | ..................... | 705/26 |
| 2007/0008621 A1 | 1/2007 | Satoh et al. | | |
| 2007/0077025 A1 * | 4/2007 | Mino | .............................. | 386/95 |
| 2007/0198367 A1 | 8/2007 | Yamagata et al. | | |
| 2007/0288504 A1 | 12/2007 | Kagawa et al. | | |
| 2007/0291026 A1 | 12/2007 | Kagawa et al. | | |
| 2008/0062170 A1 | 3/2008 | Satoh et al. | | |
| 2008/0086324 A1 | 4/2008 | Yamagata et al. | | |

FOREIGN PATENT DOCUMENTS

| | | |
|---|---|---|
| JP | 8-171646 A | 7/1996 |
| JP | 09-190456 | 7/1997 |
| JP | 2006-039872 | 2/2006 |
| JP | 2007-042077 | 2/2007 |

* cited by examiner

*Primary Examiner* — Jon Chang
(74) *Attorney, Agent, or Firm* — Dickstein Shapiro LLP

(57) ABSTRACT

In an image search apparatus, a data manager responds to an instruction for a first search condition issued via a user interface to manage data of a target model acquired from a database and generates an image to be displayed on a user interface. A determination processor responds to an instruction for a second search condition issued by positioning a pointer on the whole model image to compare a closed area defined by the specified position with boundary information of each part image, retrieves candidate part images, and prioritizes the candidate part images in order of increasing area calculated based on the boundary information. A parts selection processor displays the retrieved candidate part images on the user interface according to the order of increasing area in response to an instruction for a third search condition for choosing a target part image from among the candidate part images.

5 Claims, 5 Drawing Sheets

IMAGE SEARCH APPARATUS, IMAGE SEARCH METHOD, AND STORAGE MEDIUM STORING A PROGRAM FOR CAUSING A SEARCH APPARATUS TO EXECUTE A SEARCH METHOD

CROSS-REFERENCE TO RELATED APPLICATION

The present application is based on and claims priority from Japanese Patent Application No. 2007-218898, filed on Aug. 24, 2007 in the Japan Patent Office, the entire contents of which are hereby incorporated herein by reference.

BACKGROUND OF THE INVENTION

1. Field of the Invention

Exemplary aspects of the present invention relate to an image search apparatus, an image search method, and a storage medium storing a program for causing a search apparatus to execute a search method, and more particularly, to an image search apparatus, an image search method, and a storage medium storing a program for causing a search apparatus to execute a search method for efficiently searching for a target part image from a whole image of a product model.

2. Description of the Related Art

Due to recent improvements in computer performance and advances in graphic processing technology, use of a 3D (three-dimensional) model in CAD (computer-aided design) and CG (computer graphics) has spread rapidly. Thus, for example, in manufacturing industries, a 3D model is used for creating parts catalogs, service manuals, and the like, showing images of product models. In addition, contents including such 3D model image are used as electronic media.

Since many industrial products, including mechanical and electronic products, are composed of multiple parts, in order to use an image of a product model for a parts catalog and the like, a user needs to be able to recognize individual parts within an image of a whole product model. Typically, the user uses an image search apparatus to extract a particular part image by specifying a particular position or area within a 3D product model image.

One example of a related-art image search apparatus provides a method of extracting a particular part image from a product model provided in a closed area. When a user specifies a closed area having a particular height, width, and depth in a 3D space using a CAD system in which information on a 3D product model is stored, the image search apparatus extracts a target part image provided in the specified closed area.

In another example of a related-art image search apparatus, when a user operates a stylus with respect to a 3D geometric model, the image search apparatus defines a reference position, a reference direction, and a distance from the reference position in a 3D space as geometric search criteria, so as to extract a part image satisfying certain criteria.

However, in both of the above-described related-art image search apparatuses, in order to specify a target part image in a 3D space, the user needs to recognize a position of the target part image in the 3D space and perform complicated data input operations for specifying the target part image, thereby making the above apparatuses inconvenient. In addition, when a lot of parts are included in a product, the image search apparatuses have to perform many calculations of geometric relations therebetween, thereby decreasing their processing speed.

Therefore, there is a need for a technology to efficiently extract a particular part image from a whole image of a product model without overburdening both a computer and a user.

BRIEF SUMMARY OF THE INVENTION

This specification describes an image search apparatus according to exemplary embodiments of the present invention. In one exemplary embodiment of the present invention, the image search apparatus includes a database, a user interface, a search device, and an output device. The database is configured to store a two-dimensional whole image and a two-dimensional part image created based on a three-dimensional model formed by a combination of parts, and boundary information for each part image in the whole image. The user interface is configured to function as a graphical user interface. The search device is configured to search the database for a two-dimensional part image according to a search condition specified via an input screen of the user interface. The output device is configured to output a result of the search performed by the search device. The search device includes a data manager, a determination processor, and a parts selection processor. The data manager is configured to respond to an instruction for a first search condition issued via the user interface to manage data of a target model acquired from the database and generate an image to be displayed on the input screen of the user interface. The determination processor is configured to respond to an instruction for a second search condition issued by positioning a pointer on the whole image of the target model displayed on the input screen of the user interface to compare a closed area defined by the specified position with the boundary information of each part image of the target model, retrieve part images of which their boundaries are included in the closed area as candidate part images, and prioritize the extracted candidate part images in order of increasing area calculated based on each piece of boundary information. The parts selection processor is configured to display the candidate part images extracted by the determination processor on the input screen of the user interface according to the order of increasing area in response to an instruction for a third search condition for choosing a target part image from among the candidate part images displayed on the input screen of the user interface.

This specification further describes an image search method according to exemplary embodiments of the present invention. In one exemplary embodiment of the present invention, the image search method searches for a two-dimensional part image from a database storing a two-dimensional whole image and a two-dimensional part image created based on a three-dimensional model formed by a combination of parts, and boundary information for each part image in the whole image according to a search condition specified via an input screen of a user interface functioning as a graphical user interface. The image search method includes managing data of a target model acquired from the database according to an instruction for a first search condition issued via the user interface to generate an image to be displayed on the input screen of the user interface, responding to an instruction for a second search condition issued by positioning a pointer on the whole image of the target model displayed on the input screen of the user interface to compare a closed area defined by the specified position with the boundary information of each part image of the target model, retrieving part images of which their boundaries are included in the closed area as candidate part images, prioritizing the extracted candidate part images in order of increasing area calculated based on the boundary information, and displaying the extracted candidate part images on the input screen of the user interface according to the order of increasing area in response to an instruction for a third search condition for choosing a target part image from among the candidate part images displayed on the input screen of the user interface.

This specification further describes a computer-readable storage medium according having recorded thereon computer-readable program code for causing a computer system to execute a search method when the program code is executed on the computer system, the search method comprising managing data of a target model acquired from the database according to an instruction for a first search condition issued via the user interface to generate an image to be displayed on the input screen of the user interface, responding to an instruction for a second search condition issued by positioning a pointer on the whole image of the target model displayed on the input screen of the user interface to compare a closed area defined by the specified position with the boundary information of each part image of the target model, retrieving part images of which their boundaries are included in the closed area as candidate part images, prioritizing the extracted candidate part images in order of increasing area calculated based on the boundary information, and displaying the extracted candidate part images on the input screen of the user interface according to the order of increasing area in response to an instruction for a third search condition for choosing a target part image from among the candidate part images displayed on the input screen of the user interface.

BRIEF DESCRIPTION OF THE DRAWINGS

A more complete appreciation of the invention and the many attendant advantages thereof will be more readily obtained as the same becomes better understood by reference to the following detailed description when considered in connection with the accompanying drawings, wherein.

DETAILED DESCRIPTION OF THE INVENTION

Figure 1:
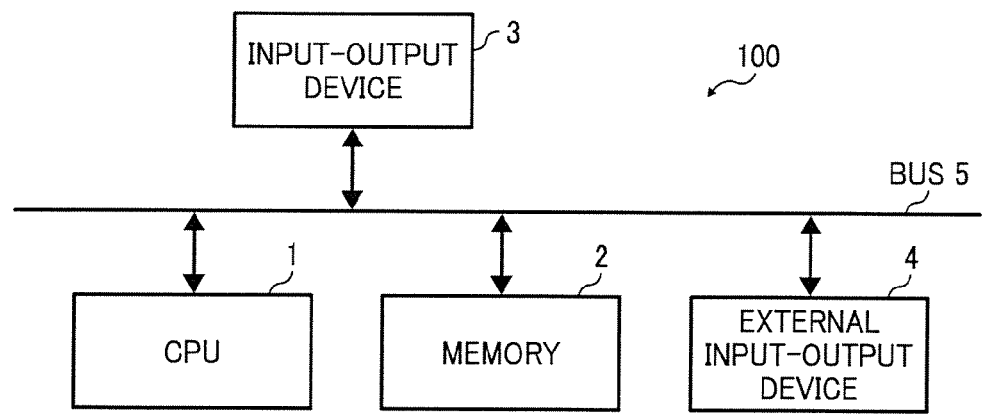
FIG. 1 is a schematic diagram of a hardware configuration of an image search apparatus according to an exemplary embodiment of the present invention.

In describing exemplary embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image search apparatus 100 according to an exemplary embodiment of the present invention is described.

According to the exemplary embodiment, the image search apparatus 100 has the ability to search a database for image data of a part (e.g., component) of a product, used to create a catalog of parts (e.g., a parts catalog) based on 3D (three-dimensional) models formed by combinations of the parts. It is to be noted that a 3D model (e.g., a geometric model) refers to a data object with a 3D shape and includes 3D CAD (computer aided design) data or data of an actual object obtained by 3D measurement.

According to the exemplary embodiment, the image search apparatus 100 serves as a system (e.g., a parts catalog creation-retrieval system) for creating a database of a parts catalog, searching the database for an image of a target part, and displaying a retrieved image of the target part so that a user can view the image.

FIG. 1 is a diagram of a hardware configuration of the image search apparatus 100. The image search apparatus 100 includes a CPU (central processing unit) 1, a memory 2, an input-output device 3, an external input-output device 4, and an internal bus 5.

The image search apparatus 100 serves as a data processor for constructing the parts catalog creation-retrieval system, and has a hardware configuration including a general purpose PC (personal computer) or a PC to which peripheral equipment is connected.

The CPU 1 controls operations of the image search apparatus 100 and uses various application programs, work data, file data, and the like, stored in the memory 2 to implement a data processing function of each application. When the CPU 1 installs application programs, described later, for creating a parts catalog and for searching and viewing the created parts catalog, the image search apparatus 100, serving as the parts catalog creation-retrieval system, is provided with a catalog creator, an image supplier, a position information supplier, and a catalog viewer, described later. The CPU 1, together with the memory 2 and the external input-output device 4, constructs various databases used for the parts catalog creation-retrieval system and manages the databases. The internal bus 5 connects the CPU 1, the memory 2, the input-output device 3, and the external input-output device 4 with each other.

Under control of the CPU 1, the input-output device 3 functions as a user interface for receiving a user's input of processing conditions or the like and notifying the user of various operational states of the image search apparatus 100 according to an input operation via a display, not shown. According to this exemplary embodiment, the input-output device 3 functions as a GUI (graphical user interface), so that the user performs an input operation to an input screen displayed on the display using a keyboard, a mouse, and the like.

The external input-output device 4 is a peripheral device provided for extending a function of the input-output device 3. For example, the external input-output device 4 serves as an external storage device capable of using a recording medium for obtaining data necessary for processing from an outside thereof or capable of using a recording medium with a great capacity for construction of a database, or serves as an output device (e.g., a printer, a display device, and the like) using data output from the parts catalog creation-retrieval system.

A detailed description is now given of the parts catalog creation-retrieval system.

According to the exemplary embodiment, the parts catalog creation-retrieval system creates a database (e.g., a catalog DB) of a parts catalog and searches the catalog DB for a parts catalog specified by a user to display the parts catalog.

More specifically, the catalog DB creation function creates a DB of a parts catalog including a two-dimensional image based on a 3D model (e.g., 3D data) formed by combinations of parts (components). The DB manages contents including a two-dimensional image useful for a catalog, attributes for parts identification, and particular data of each part. In response to a user's search request, the parts catalog searching and displaying function outputs and displays data (e.g., two-dimensional data) of a part specified by the user, managed by the catalog DB.

Figure 2:
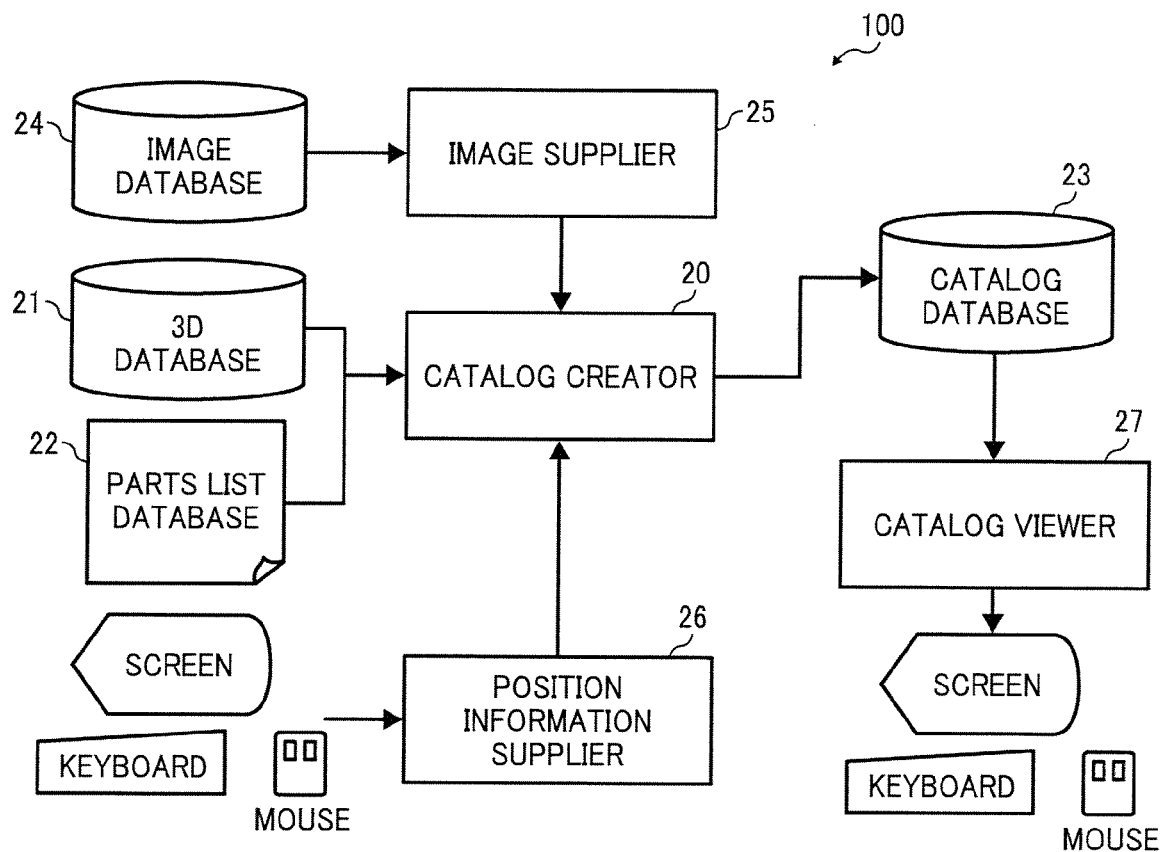
FIG. 2 is a schematic diagram of a software configuration of the image search apparatus shown in FIG. 1.

Referring to FIG. 2, a description is now given of a software configuration of the image search apparatus 100, serving as the parts catalog creation-retrieval system. FIG. 2 is a schematic diagram of the software configuration thereof.

The parts catalog creation-retrieval system includes a catalog creator 20, an image supplier 25, a position information supplier 26, and a catalog viewer 27. The parts catalog creation-retrieval system further includes several databases, including a 3D database 21, a parts list database 22, a catalog database 23, and an image database 24.

As described above, under control of the CPU 1 (depicted in FIG. 1), the memory 2, the input-output device 3, and the like form and construct the data processor and the databases of the parts catalog creation-retrieval system.

A description is now given of a configuration and operation of creating the catalog DB (e.g., the catalog database 23).

The 3D database 21 stores a geometric model, for example, 3D CAD data, used for creation of a catalog. The 3D CAD data includes information on a shape of each part of a product and information on the whole product assembled with all parts.

The parts list database 22 stores a data list of exchangeable parts to be included in the catalog. The data list includes such information as a name of a part and a number of the part when ordered, and is managed in a product unit.

Some of the parts registered in the data list stored in the parts list database 22 have 3D CAD data stored in the 3D database 21 and some do not. When the 3D CAD data is stored in the 3D database 21, the catalog creator 20 refers to the 3D CAD data stored in the 3D database 21. By contrast, when the 3D CAD data is not stored in the 3D database 21, the catalog creator 20 refers to image data supplied from the image supplier 25.

The image supplier 25 acquires the image data from the image database 24 storing a two-dimensional image data and supplies the image data to the catalog creator 20. When the position information supplier 26 supplies position information to the catalog creator 20, the catalog creator 20 creates a parts catalog according to the supplied position information.

The image database 24 stores image data of a part prepared and supplied to the catalog creator 20 when the 3D database 21 does not store 3D CAD data of the part. According to this exemplary embodiment, since the parts catalog creation-retrieval system creates a parts catalog with two-dimensional images, the image data stored in the image database 24 is two-dimensional image data. Therefore, the image database 24 may store an image taken by a digital still camera and an image created by drawing, for example.

Since the part image data supplied from the image database 24 is data of the part image alone, installation position of the part image within the whole product image needs to be specified. Therefore, when the user specifies the position of the part image via the input-output device 3, the position information supplier 26 supplies the specified position information to the catalog creator 20.

Both when the 3D CAD database 21 stores 3D CAD data of each part and when the 3D CAD database 21 does not store 3D CAD data of each part, the catalog creator 20 creates two-dimensional image data of the specified part as catalog data and outputs the data to a processor that uses the data in a subsequent process. In addition to image data and a name of a part for display to the user as a catalog, the catalog data includes an attribute for identifying each part or particular datum, useful for searching and the like.

According to the exemplary embodiment, the user views the parts catalog by using the parts catalog creation-retrieval system. Namely, the catalog database 23 stores the parts catalog created by the catalog creator 20, and the user uses the catalog data stored in the catalog database 23 via the catalog viewer 27 serving as a search device.

In particular, according to the exemplary embodiment, since the catalog viewer 27 handles two-dimensional image data created from a 3D geometric model, the catalog database 23 stores in advance data of an image of a geometric model, described later, as seen from a plurality of different viewpoints at a plurality of different zoom levels, an image with a specific part highlighted, described later, boundary information for specifying a boundary of an image area of each image occupied by a specific part, an individual image of each part, described later, as seen from a plurality of different viewpoints at a plurality of different zoom levels, and the like, and supplies the above images with a name of a part.

Alternatively, the catalog database 23 does not prepare easily-available data and the like (e.g., an image at a specified magnification ratio) but instead generates easily-available data upon request as needed. When the catalog database 23 stores a great amount of information, the external input-output device 4 constructs the catalog database 23.

A description is now given of a configuration and operation of the parts catalog searching and displaying function.

Specifically, the function is to search for a target part image and the like from the data created by the parts catalog creation function and managed by the catalog database 23. It is to be noted that the catalog viewer 27 performs the function.

The catalog viewer 27 searches the catalog database 23 for target catalog data based on a user's request. When the catalog viewer 27 accepts the user's request via a screen of the input-output device 3 serving as a GUI, the catalog viewer 27 acquires data of a model specified by the user from the catalog database 23 in a first search, displays a two-dimensional whole image of the model acquired by the first search, searches the data acquired by the first search for two-dimensional images of candidate parts specified from the whole image by the user in a second search, displays the two-dimensional images of the candidate parts on the screen, and in a third search searches for catalog data of a part specified from among the candidate parts by the user.

Since both the whole image for display to the user and the part image for a catalog include two-dimensional image data, the user can simply and easily find and choose a target part image, thereby reducing a load on a processing system, which is one of the main features of the exemplary embodiment.

According to the exemplary embodiment, the image search apparatus 100, serving as the parts catalog creation-retrieval system, includes the following additional function in order to reduce a workload on the user choosing a target part image.

In the second search, when the user specifies a part image from the whole image displayed on the screen of the GUI, such as the input-output device 3 depicted in FIG. 1, the catalog viewer 27 asks the user to designate a location of the part image relative to the whole image displayed on the screen. Upon receipt of the designation, the catalog viewer 27 narrows down retrieved part images. For example, based on the designation of the location, when the catalog viewer 27 defines an area including the target part image, all part images included in the area are selected as candidates for the target part image. When the catalog viewer 27 shows the candidates to the user, the user chooses the target part image from among the candidates. According to the user's choice of the target part image, the catalog viewer 27 performs the third search and outputs a result thereof.

In addition to the above selection operation, the catalog viewer 27 has an additional function of prioritizing a plurality of candidate part images selected in the second search in order of increasing area of the part images relative to an area of the whole image of the geometric model displayed on the screen and showing the user the plurality of candidate part images according to the order of increasing area via the display of the GUI, that is, the input-output device 3 depicted in FIG. 1.

The additional function provides various types of display designs to allow the user to easily select a small part image that is otherwise hard to find, especially when many candidate part images are displayed on the screen.

Figure 3:
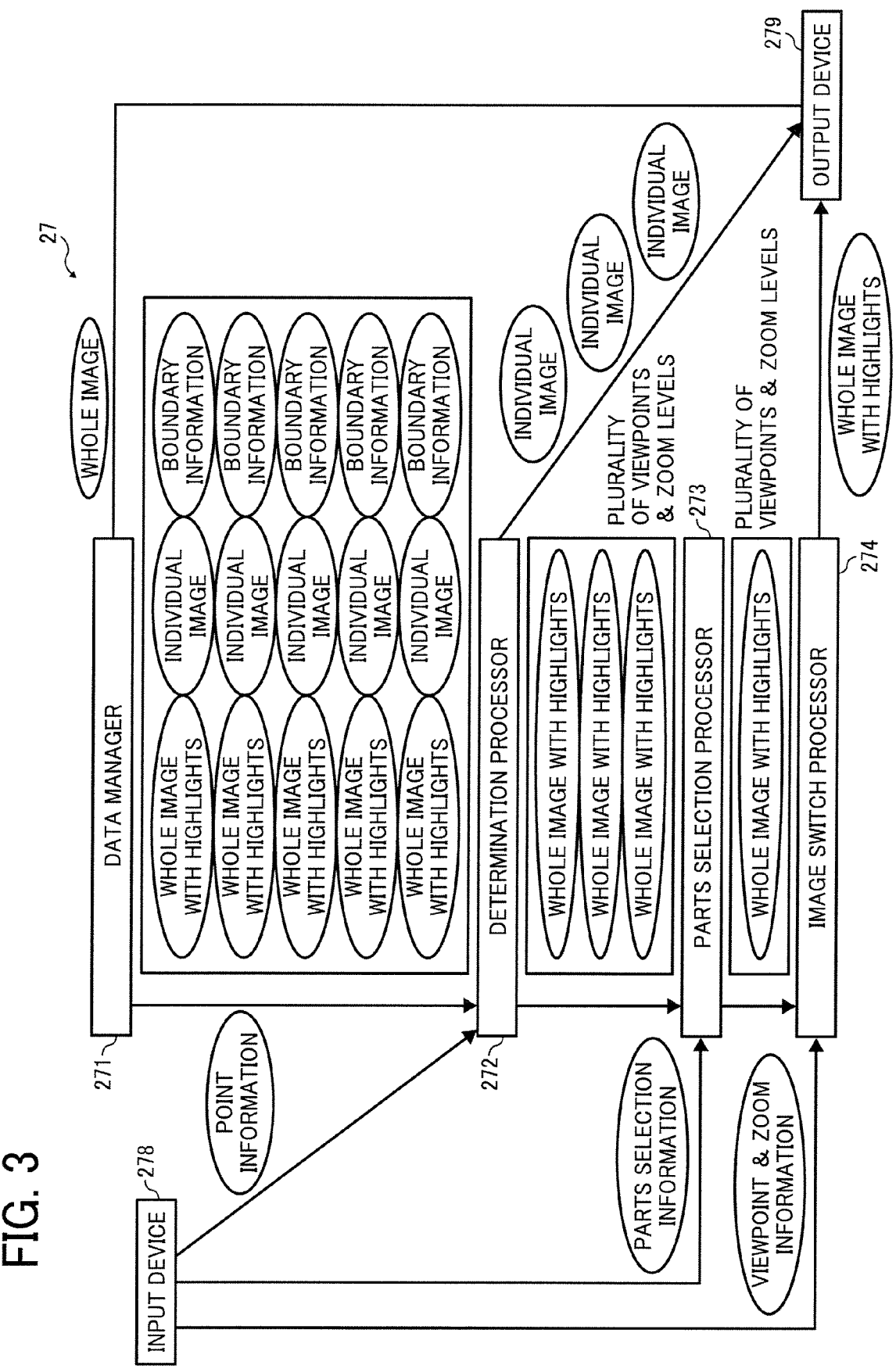
FIG. 3 is a schematic diagram of a catalog viewer included in the image search apparatus shown in FIG. 2.

FIG. 3 is a block diagram of a configuration of the catalog viewer 27 of the parts catalog creation-retrieval system. It is to be noted that arrows depicted in FIG. 3 indicate a flow of data.

The catalog viewer 27 includes an input device 278, an output device 279, a data manager 271, a determination processor 272, a parts selection processor 273, and an image switch processor 274.

The input device 278 is an input member of the user interface having a GUI function, and includes a mouse and a keyboard, so that, using the mouse and the keyboard, the user can input instructions and information necessary for searching and viewing the parts catalog.

The output device 279 is an output member of the user interface having a GUI function, and includes a display to notify the user of necessary information in accepting an input of a user's request for searching and viewing a parts catalog and a result of searching and viewing the parts catalog.

The data manager 271 includes an internal memory, and manages various types of data handled in processing of searching and viewing the parts catalog.

In accepting the user's request for viewing the parts catalog, the data manager 271 refers to the catalog data stored in the catalog database 23 with respect to the geometric model specified by the user via the input device 278, retrieves a whole image with highlight, an individual part image, and boundary information as seen from a plurality of viewpoints at a plurality of zoom levels with respect to the whole image of the specified geometric model and all constituent part images of the geometric model, and writes the whole image with highlight, the individual part image, and the boundary information in the internal memory, in response to the processing of searching and viewing the parts catalog.

The whole image with highlight is an image of the entire model with a highlighted part on which the user is focusing. The focused part is displayed in a manner different from that of other parts, for example, the focused part may be displayed in a particular color (e.g., red or the like), or may be blinked.

The individual part image is an image of the focused part alone and includes attached information for specifying the part such as a name of the part and the like.

The boundary information relates to a boundary between an area of the focused part and an area other than the area of the focused part. For example, the boundary information includes geometric data (e.g., a dot, a curved line, and a curved surface) and phase data indicating a correlation of the geometric data.

According to this exemplary embodiment, the whole image with highlight and the boundary information include an image and information of each part as seen from a plurality of viewpoints at a plurality of zoom levels.

The determination processor 272 performs determination for reducing the number of choices of a target part image in the whole image of the geometric model displayed on the display of the output device 279. Specifically, when the user moves a pointer, not shown, on a screen on which the whole image is displayed to specify a position of a target part image, the determination processor 272 defines a closed area according to the specified position, determines whether each part image is within or without the closed area, and defines part images within the closed area as candidate part images.

For example, when the whole image of the geometric model seen from a specific viewpoint is displayed on the screen of the output device 279, the user specifies a position (e.g., a point) around an area of the target part image using the pointer. The determination processor 272 determines a predetermined closed area including the above point, for example, a circular area centered on the point or a rectangular area in which the above point is at the intersection of diagonal lines thereof.

The determination processor 272 compares information of the closed area determined based on the point specified by the user using the pointer and the boundary information of each part image stored in the data manager 271 and extracts part images of which their boundaries are within the closed area as candidate part images. Thereafter, the determination processor 272 retrieves information for identifying the whole image with highlight corresponding to the candidate part images as seen from a plurality of viewpoints at a plurality of zoom levels and transmits the information to the parts selection processor 273.

Since the determination processor 272 displays the candidate part images on the display of the output device 279 to allow the user to choose the target part image, the determination processor 272 transmits an individual image of the candidate part or a name thereof to the output device 279.

When a plurality of candidate part images has been chosen, the determination device 272 prioritizes the plurality of candidate part images in order of increasing area, configures a screen display of the GUI showing the user the plurality of candidate part images arranged in the order of increasing area, so that the user can easily find a target part image from among the plurality of candidate part images. It is to be noted that a size of each part image is determined according to an occupied area of the part image relative to the whole image of the geometric model.

In order to efficiently display to the user the plurality of candidate part images according to the order of increasing area, the output device 279 determines a display position or a size of the individual part image according to the order of increasing area. For example, a candidate part image with higher priority can be displayed in a more recognizable position on the screen, or can be displayed in an increased size recognizable to the user because the determination processor 272 displays the candidate part image with higher priority in smaller size, thereby facilitating selection of the target part image from among the plurality of candidate part images. This is especially effective when many candidate part images are displayed on the screen at once.

The area of the part image determining its priority order is calculated based on the boundary information of each part image relative to the whole image of the geometric model. The boundary information of the part image is represented by assembly of points (e.g., coordinates) on the boundary of each part image on a surface of the whole image of the geometric model. Thus, a size of an area inside the boundary is calculated based on the assembly of the coordinates on the boundary.

Alternatively, the size of the area of the part image may be obtained, for example, by an approximate calculation of a size of an area of a virtual rectangular shape surrounding the boundary of the part image.

The above-described information for changing the screen display of the candidate part images according to the order of increasing area is added to the information of the individual image of the candidate part transmitted from the determination processor 272 to the output device 279.

The parts selection processor 273 receives the information for identifying the whole image with highlight corresponding to the candidate part image chosen by the determination processor 272. The parts selection processor 273 also manages the information of the candidate part image as an object to be processed, retrieves the information for identifying the whole image with highlight corresponding to the target part image specified by the user from among the individual images of the candidate parts displayed on the display of the input device 278 from a plurality of viewpoints at a plurality of zoom levels, and transmits the above information to the image switch processor 274 as information of the target part image.

The image switch processor 274 receives the information for identifying the whole image with highlight corresponding to the target part image chosen by the user. Based on that information, the image switch processor 274 displays the whole image with highlight corresponding to the part image on the display of the output device 279. For example, when the user designates a viewpoint and a zoom level for the target part image with respect to the whole image with highlight via the input device 278, the image switch processor 274 receives the designation from the input device 278. Alternatively, when there is no designation, default viewpoint and zoom level are applied.

In other words, the image switch processor 274 acquires the part image data managed by the data manager 271, retrieves the whole image with highlight based on the information for identifying the whole image with highlight corresponding to the target part image transmitted from the parts selection processor 273 and the user-specified viewpoint and zoom level, and displays the whole image with highlight on the display of the output device 279.

Referring to FIGS. 4, 5, and 6A, 6B, and 6C, a description is now given of processes performed by the catalog viewer 27 (depicted in FIG. 2) for searching and displaying the parts catalog.

Figure 4:
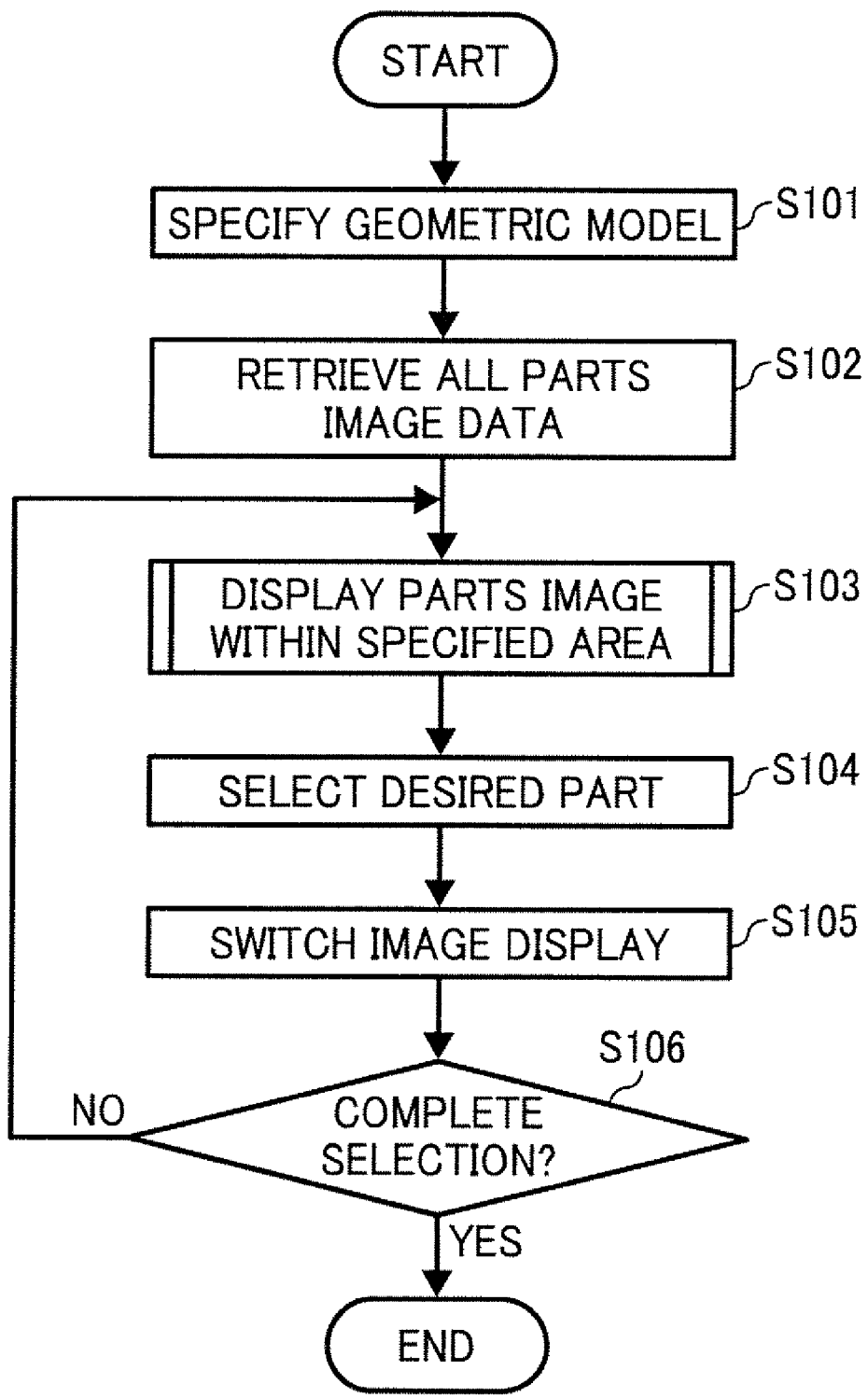
FIG. 4 is a flowchart illustrating a search process performed by the catalog viewer shown in FIG. 3.

FIG. 4 is a flowchart of the processes performed by the catalog viewer 27 for searching and displaying the parts catalog.

In step S101, when the output device 279 (depicted in FIG. 3), serving as a GUI, displays a selection screen showing a list of geometric models and the like stored in the catalog database 23 (depicted in FIG. 2), a user specifies a geometric model including a target part which the user wants to view via the input device 278 (depicted in FIG. 3) as an instruction for setting a first search condition. Upon receipt of the instruction, in step S102 the data manager 271 (depicted in FIG. 3) retrieves a whole image with highlight, an individual part image, and boundary information as seen from a plurality of viewpoints at a plurality of zoom levels from the catalog database 23 (depicted in FIG. 2) with respect to the whole image of the specified geometric model and all parts of the geometric model, writes the whole image with highlight, the individual part image, and boundary information in the internal memory, and causes the output device 279 to display the whole image of the geometric model.

Figure 6A:
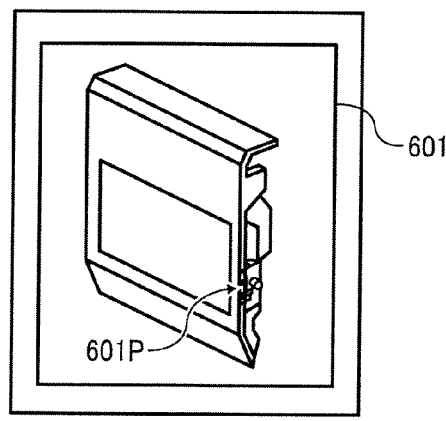
FIG. 6A is an illustration of a whole image of a geometric model displayed on an input-output device included in the image search apparatus shown in FIG. 1.

FIG. 6A is an illustration of one example of a whole image of a geometric model. The output device 3 (depicted in FIG. 1), functioning as a GUI in the above search process, displays an image 601 as the whole image.

Subsequently, in order to narrow down target part images, when the output device 279 displays a plurality of whole images of the geometric model on the display thereof, the user moves a pointer, not shown, of the input device 278 on the image 601 to specify a position around the target part image which the user wants to view as an instruction for setting a second search condition. The position specified by the user is indicated by an arrow 601P on the image 601 of the output device 279 in FIG. 6A.

Figure 5:
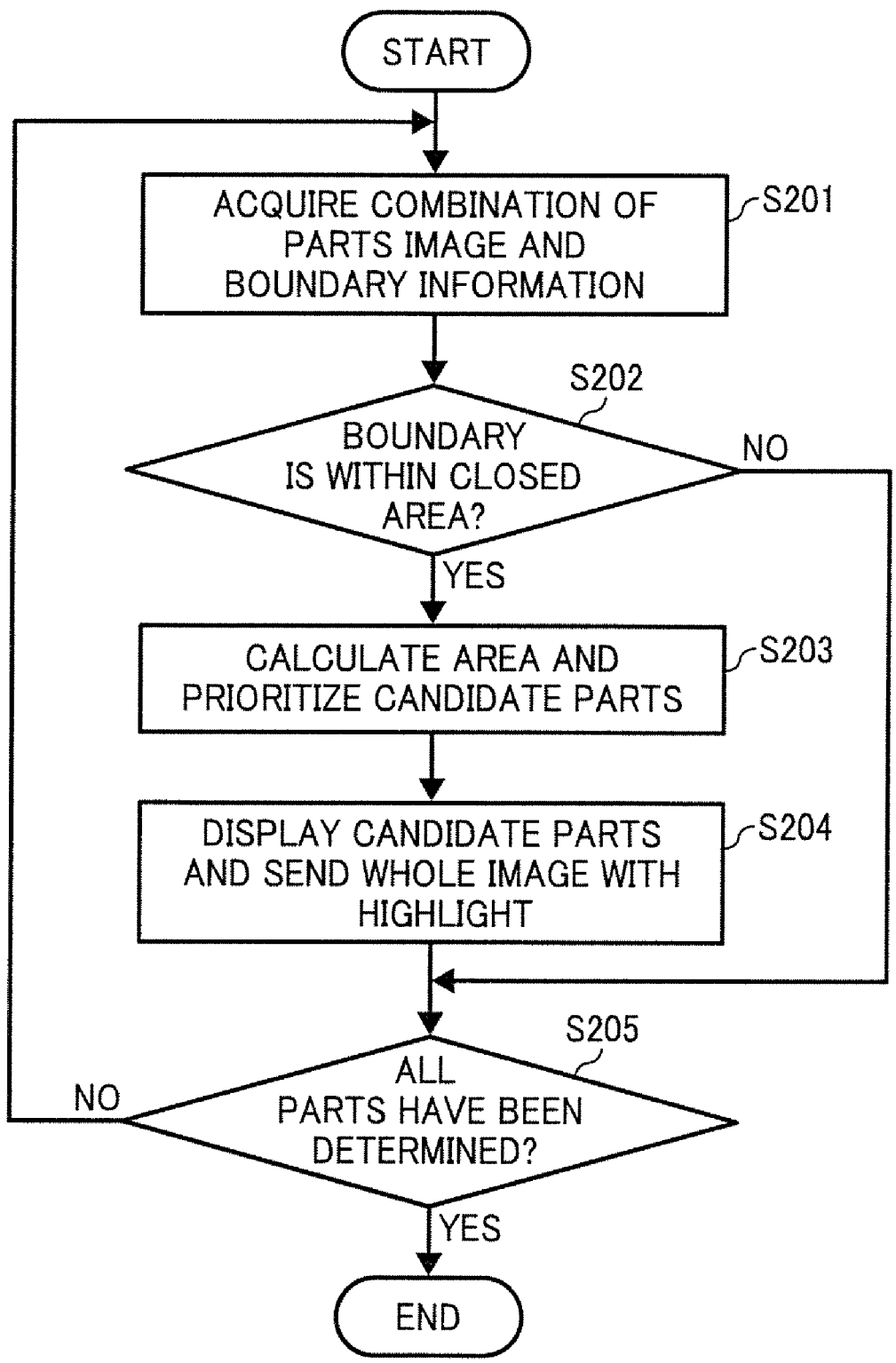
FIG. 5 is a flowchart illustrating a determination process performed by a determination processor included in the catalog viewer shown in FIG. 3.

Thereafter, upon receipt of the specification, in step S103 the determination processor 272 extracts candidates for the target part image, after which the output device 279 displays a result thereof on the display. FIG. 5 is a flowchart illustrating a series of processes performed by the determination processor 272.

In step S201, the determination processor 272 acquires a combination of a whole image with highlight, an individual part image, and boundary information of one part image from information of the geometric model retrieved by the data manager 271.

In step S202, the determination processor 272 compares information of a closed area determined based on the position specified by the user using the pointer and the boundary information of the above part image and confirms whether or not a boundary of the part image is included in the closed area.

When the boundary of the part image is not included in the closed area (NO at step S202), the determination processor 272 determines that the part image is not the target part image to exclude the part image from candidate part images. In step S205 the determination processor 272 checks whether or not all other part images have been determined.

Alternatively, when the boundary of the part image is included in the closed area (YES at step S202), the determination processor 272 identifies the part image as a candidate part image and extracts a combination of the whole image with highlight, the individual part image, and boundary information of the part image.

In step S203, based on the boundary information of the candidate part image, the determination processor 272 calculates a size of an area of the candidate part image inside the boundary, compares the calculated size of the candidate part image with that of other extracted candidate part images, prioritizes the candidate part images in order of increasing area, and adds the order of increasing area information to the above combination of information.

Figure 6B:
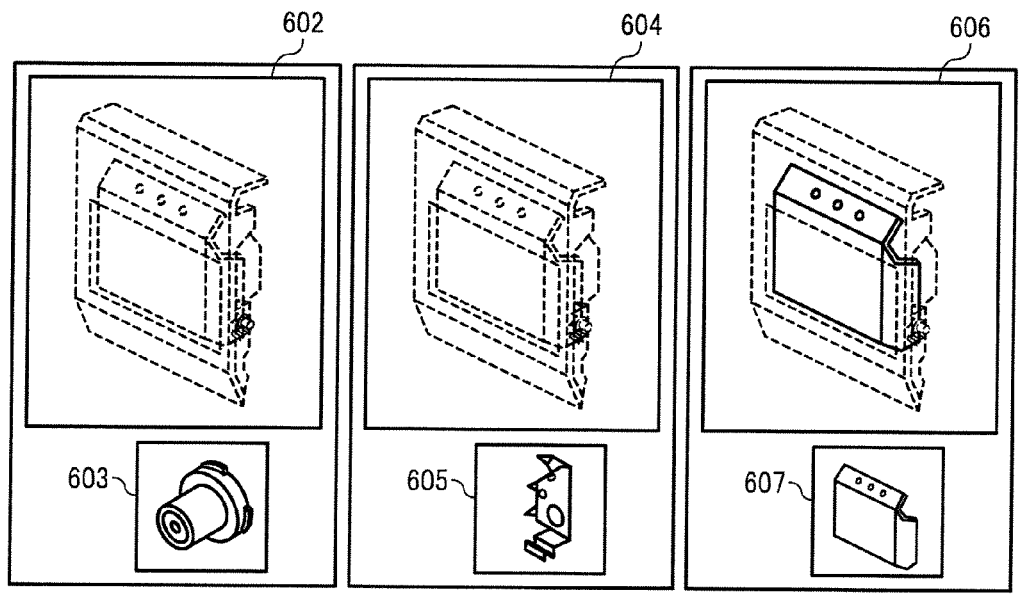
FIG. 6B illustrates combinations of a whole image with highlight and an individual target part image.

In step S204, the determination processor 272 causes the output device 279 to display the extracted candidate part images. For example, the output device 279 displays a combination of a whole image with a highlighted target part image and an individual image of the target part or a name thereof. FIG. 6B illustrates examples of a combination of a whole image with highlight and an individual image of the target part. The examples include combinations of a whole image with highlight 602 and an individual image 603, a whole image with highlight 604 and an individual image 605, and a whole image with highlight 606 and an individual image 607. It is to be noted that, as illustrated in the whole images with highlight 602, 604, and 606 in FIG. 6B, the whole image may be drawn in a semitransparent line (e.g., a broken line) or drawn as a wireframe image, while the target part image may be drawn in a solid line.

When there are not many candidate part images, for example, as illustrated in FIG. 6B, the display device 279 can simultaneously display three combinations of the whole images with highlight 602, 604, and 606 and the individual images 603, 605, and 607, respectively. According to the predetermined priority order, a candidate part image with a smaller area is displayed on a more recognizable position, for example, from left to right, as illustrated in FIG. 6B.

Figure 6C:
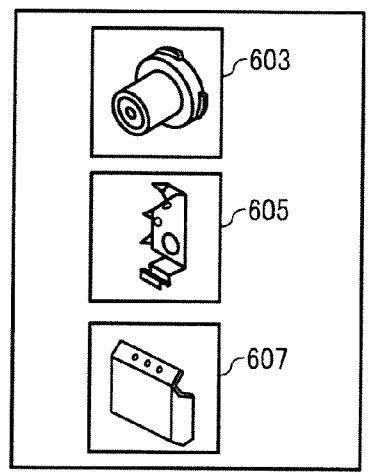
FIG. 6C is an illustration of the individual images shown in FIG. 6B.

However, depending on a condition of extraction of the candidate parts from the target geometric model, a size of the display, or the like, when the determination processor 272 extracts too many candidate part images, not all of the candidate part images can be displayed at once on the output device 279. In such a case, as illustrated in FIG. 6C, the output device 279 displays a list of the individual images 603, 605, and 607 or the names of the parts arranged in the order of increasing area, for example, from the top to the bottom, so that the user can easily identify and choose a target part image from the list displayed on the display of the output device 279. In addition, for example, the display of the output device 279 includes a function key to display a whole image with highlight, so that the user presses the function key to confirm the whole image with highlight.

Meanwhile, the determination processor 272 retrieves information for identifying the whole image with highlight with respect to the extracted candidate part images, as seen from a plurality of viewpoints at a plurality of zoom levels, and transmits the information to the parts selection processor 273 in step S204. It is to be noted that the above whole image with highlight is supplied in advance to the parts selection processor 273, so as to be displayed to the user when the user chooses the part image.

In step S205, the determination processor 272 checks whether or not all part images have been determined to be included in the closed area. When there are still some undetermined part images (NO at step S205), the processing returns to step S201.

When all the part images have been determined (YES at step S205), the determination processing ends.

Thereafter, referring back to FIG. 4, processing returns to step S104, where the parts selection processor 273 selects the target part image from among the plurality of candidate part images included in the specified area in the previous process. That is, as an instruction of setting a third search condition based on a result of the second search, the user operates the input device 278 to specify the target part from the individual part images or names of candidate parts displayed on the display of the output device 279. Upon receipt of the specification, the parts selection processor 273 acquires information for identifying the whole image with highlight corresponding to the target part image from the information of the candidate part images retrieved by the data manager 271 as seen from a plurality of viewpoints at a plurality of zoom levels, and transmits the information to the image switch processor 274.

Upon receipt of the information of the whole image with highlight corresponding to the target part image from the parts selection processor 273, in step S105, the image switch processor 274 manages the information and switches image display according to a default viewpoint or zoom level, or a viewpoint or zoom level specified by the user.

That is, based on the information for identifying the whole image with highlight corresponding to the target part image transmitted from the part selection processor 273, the image switch processor 274 acquires data of the target part image managed by the data manager 271, retrieves the whole image with highlight corresponding to the target part image according to the user-specified viewpoint and zoom level, and displays the whole image on the display of the output device 279. Alternatively, when there is no user's specification, the whole image with highlight is displayed from a default viewpoint at a default zoom level.

Thereafter, the user can view a catalog of the target part. In step S106, the determination processor 272 determines whether or not the user chooses any other parts with respect to the geometric model. When the user no longer chooses any parts with respect to the geometric model (YES at step S106), the user can perform input operation of pressing an End key, not shown, or the like. The determination processor 272 confirms the input operation and processing ends.

Alternatively, when the user wants to view other parts (NO at step S106), the user performs input operation of pressing a Continue key, not shown, or the like. The determination processor 272 confirms the input operation, and the processing returns to step S103 and is repeated until the user finishes parts selection.

According to this exemplary embodiment, when a user specifies a particular point of a whole image of a geometric model displayed on the output device 279 (depicted in FIG. 3), the image search apparatus 100 (depicted in FIG. 2) narrows down target part images to part images provided around the point as candidate part images. In addition, when the user chooses a target part image from a list of the candidate part images displayed on the output device 279, the candidate part images are prioritized in order of increasing area, thereby reducing a workload on the user.

Moreover, since the image search apparatus 100 uses two-dimensional image data instead of 3D geometric data used in a conventional method, the image search apparatus 100 may facilitate its searching and displaying processing with a decreased load on a computer. Accordingly, even a low-performance computer may sufficiently perform the processing.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

As can be appreciated by those skilled in the art, although the present invention has been described above with reference to specific exemplary embodiments the present invention is not limited to the specific embodiments described above, and various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. An image search apparatus, comprising:
a database configured to store a two-dimensional whole image and a two-dimensional part image created based on a three-dimensional model formed by a combination of parts, and boundary information for specifying a boundary of each part image in the whole image;

a user interface configured to function as a graphical user interface;

a search device configured to search the database for a two-dimensional part image according to a search condition specified via an input screen of the user interface; and an output device configured to output a result of the search performed by the search device, the search device comprising:

a data manager configured to respond to an instruction for a first search condition issued via the user interface to manage data of a target model acquired from the database and generate an image to be displayed on the input screen of the user interface; and a determination processor configured to respond to an instruction for a second search condition according to a position specified by positioning a pointer on the whole image of the target model displayed on the input screen of the user interface to compare a closed area defined by the specified position with the boundary information of each part image in the whole image of the target model, retrieve part images in the whole image of the target model in which the boundary of each retrieved part image is included in the closed area as candidate part images, and prioritize the retrieved candidate part images in order of increasing area calculated based on the boundary information; and a parts selection processor configured to display the candidate part images extracted by the determination processor on the input screen of the user interface according to the order of increasing area in response to an instruction for a third search condition for choosing a target part image from among the candidate part images displayed on the input screen of the user interface.

2. The image search apparatus according to claim 1, wherein the data manager causes the whole image and the part image to be displayed on the input screen of the user interface according to a viewpoint and zoom level specified via the input screen of the user interface with the part image highlighted.

3. An image search method for searching for a two-dimensional part image from a database storing a two-dimensional whole image and a two-dimensional part image created based on a three-dimensional model formed by a combination of parts, and boundary information for specifying a boundary of each part image in the whole image according to a search condition specified via an input screen of a user interface functioning as a graphical user interface, the image search method comprising:

managing data of a target model acquired from the database according to an instruction for a first search condition issued via the user interface to generate an image to be displayed on the input screen of the user interface;

responding to an instruction for a second search condition according to a position specified by positioning a pointer on the whole image of the target model displayed on the input screen of the user interface to compare a closed area defined by the specified position with the boundary information of each part image in the whole image of the target model;

retrieving part images in the whole image of the target model in which the boundary of each retrieved part image is included in the closed area as candidate part images;

prioritizing the retrieved candidate part images in order of increasing area calculated based on the boundary information; and displaying the retrieved candidate part images on the input screen of the user interface according to the order of increasing area in response to an instruction for a third search condition for choosing a target part image from among the candidate part images displayed on the input screen of the user interface.

4. The image search method according to claim 3, wherein the whole image and the part image are displayed on the input screen of the user interface according to a viewpoint and zoom level specified via the input screen of the user interface with the part image highlighted.

5. A non-transitory computer-readable storage medium having recorded thereon computer-readable program code for causing a computer system to execute a search method when the program code is executed on the computer system, the search method comprising:

managing data of a target model acquired from a database according to an instruction for a first search condition issued via a user interface to generate an image to be displayed on an input screen of the user interface, the data of the target model acquired from the database being comprised of a two-dimensional whole image and a two-dimensional part image created based on a three-dimensional model formed by a combination of parts, and boundary information for specifying a boundary of each part image in the whole image;

responding to an instruction for a second search condition according to a position specified by positioning a pointer on the whole image of the target model displayed on the input screen of the user interface to compare a closed area defined by the specified position with the boundary information of each part image in the whole image of the target model;

retrieving part images in the whole image of the target model in which the boundary of each retrieved part image is included in the closed area as candidate part images;

prioritizing the retrieved candidate part images in order of increasing area calculated based on the boundary information; and displaying the retrieved candidate part images on the input screen of the user interface according to the order of increasing area in response to an instruction for a third search condition for choosing a target part image from among the candidate part images displayed on the input screen of the user interface.

* * * * *